(12) United States Patent
Seheult et al.

(10) Patent No.: US 6,646,095 B2
(45) Date of Patent: Nov. 11, 2003

(54) PROCESS FOR THE MANUFACTURE OF COPOLYMERS OF FORMALDEHYDE AND DIPHENYL OXIDE

(75) Inventors: Kelly J. Seheult, Concord, NC (US); Shane M. Carter, New London, NC (US); Lawrence J. Scotchie, Charlotte, NC (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 94 days.

(21) Appl. No.: 10/052,422

(22) Filed: Jan. 16, 2002

(65) Prior Publication Data
US 2003/0162936 A1 Aug. 28, 2003

(51) Int. Cl.$^7$ .............................................. C08G 14/04

(52) U.S. Cl. ...................... 528/129; 528/141; 528/144; 528/154; 528/486; 528/487; 528/503; 525/480; 525/519; 525/534; 525/538

(58) Field of Search ................................ 528/129, 141, 528/144, 154, 486, 487, 503; 525/480, 519, 534, 538

(56) References Cited

U.S. PATENT DOCUMENTS 3,579,470 A    5/1971   Runk
3,914,194 A * 10/1975   Smith

* cited by examiner

Primary Examiner—Duc Truong
(74) Attorney, Agent, or Firm—Jane E. Gennaro

(57) ABSTRACT

A process for the manufacture of copolymers of formaldehyde and diphenyl oxide and a carboxylic acid uses and acid with a pKa in the range of 1.2 to 3 as the catalyst.

7 Claims, No Drawings

PROCESS FOR THE MANUFACTURE OF COPOLYMERS OF FORMALDEHYDE AND DIPHENYL OXIDE

FIELD OF THE INVENTION

This invention relates to a process for the manufacture of copolymers of formaldehyde and diphenyl oxide having dependent unsaturation derived from the concurrent reaction with olefinically unsaturated mono- or dicarboxylic acids.

BACKGROUND OF THE INVENTION

In the manufacturing process for copolymers of formaldehyde (CHO), diphenyl oxide (DPO) and olefinically unsaturated mono- or dicarboxylic acids, taught by U.S. Pat. No. 3,914,194, the reaction requires the presence of a strong inorganic or organic catalyst having a pKa of less than 0.5 in water.

The reaction of formaldehyde and the acid produces the methylol cation $^+CH_2OH$. Attack of this cation on the phenyl rings of DPO followed by condensation with further DPO leads to the oligomeric backbone of the copolymer. Terminal $^+CH_2OH$ groups then react with the olefinically unsaturated mono or dicarboxylic acid to form the corresponding ester end groups.

A key specification for these copolymer products is the viscosity of the neat resin, and a key requirement is that the viscosity level be consistent from batch to batch. A problem with using a strong acid as catalyst in the manufacturing process is that viscosity of the neat resin can vary from less than 10,000 mPa.s to greater than 100,000 mPa.s even when the processing parameters are held within a very narrow range from batch to batch.

Another key specification in the manufacture of these copolymers is that residual levels of starting materials in the final product be sufficiently low so as not to interfere with the performance of the final product. Production batches made with strong acid catalysts usually result in levels of residual starting materials that are unacceptable.

This creates a need for a manufacturing process for these materials that is not overly sensitive to small changes in processing parameters so that viscosity and residual starting material amounts can be manipulated to fall within required specifications, and to fall consistently within those specifications from batch to batch.

SUMMARY OF THE INVENTION

This invention is a process for the manufacture of a copolymer of formaldehyde or paraformaldehyde, diphenyl oxide, and a mono- or dicarboxylic acid in the presence of an acid catalyst with a pKa within the range of 1.2 to 3. Two consequences of the use of an acid with a pKa within this range are that the product viscosity is less sensitive to reaction conditions compared to the use of acids with lower pKa values, and levels of residual starting materials can be kept to acceptably low levels for commercial use.

DETAILED DESCRIPTION OF THE INVENTION

The formaldehyde component of this process can be used in all its forms, including solutions in water or aqueous methanol, or paraformaldehyde.

The diphenyl oxide can be unsubstituted, or the aromatic rings can be substituted with alkyl groups of one to ten carbon atoms, or can be halogenated in one or both rings. It is preferred to use diphenyl oxide in solid form and not in an aqueous solution.

Acids with pKa values within the range of 1.2 to 3.0 for use as catalysts include o-aminobenzosulfonic (pKa 2.48), arsenic (pKa 2.25), bromoacetic (pKa 2.69), o-bromobenzoic (pKa 2.84), chloroacetic (pKa 2.85), chlorobenzoic (pKa 2.92), chlorobutyric (pKa 2.86), chloropropionic (pKa 2.83), cyanoacetic (pKa 2.45), cyanobutyric (pKa 2.42), cyanophenoxyacetic (pKa 2.98), dichloroacetic (pKa 1.48), dichloroacetylacetic (pKa 2.11), dihydroxybenzoic (pKa 2.94), dihydroxymalic (pKa 1.92), dinicotinic (pKa 2.80), fluorobenzoic (pKa 2.90), hydroxybenzoic (pKa 2.97), iodobenzoic (pKa 2.85), lysine (pKa 2.15), maleic (pKa 1.83), malonic (pKa 2.83), nitrobenzoic (pKa 2.16), oxalic (pKa 1.23), phosphoric (pKa 2.12), phosphorous (pKa 2.00), phthalic (pKa 2.89), quinolinic (pKa 2.52), tartaric (pKa 2.98), trihydroxybenzoic (pKa 1.68), selenious (pKa 2.46), sulfurous 1.81), tellurous (pKa 2.48).

It is preferred that the acids be used in solid form and not in aqueous solution. Preferred acids are those with a pKa in the range of 1.75 to 2.25. A more preferred acid is phosphorous acid.

Olefinically unsaturated monocarboxylic acids suitable for use in this process will have three to ten carbon atoms and include acrylic, crotonic, angelic, methacrylic, ethacrylic, oleic and linoleic acids. Olefinically unsaturated dicarboxylic acids or anhydrides will have four to twelve carbons atoms and include maleic, fumaric, itaconic, 3-hexene-1,6-dicarboxylic acid, citaconic phenyl maleic, and similar acids.

All the reactants are charged to the reactor and brought up to reaction temperature over a period of one to two hours, and then held at the reaction temperature for a period of time between 18 to 30 hours, preferably 22 to 26 hours. The reaction temperature generally is in a range of 86° and greater to 94° C. and lower, preferably 88° and greater to 92° C. and lower, and more preferably 90° C. The range for the reaction temperature is generally lower and for the reaction time longer than in prior art processes, which is attributed to the higher pKa values of the acid catalysts. The weaker acid and milder reaction temperature compared to those of prior art processes is believed to make the viscosity of the product less sensitive to minor variations in reaction parameters. The result is product with viscosity consistent from batch to batch.

The stoichiometry of this process is determined relative to DPO. (DPO is the limiting reagent inasmuch as any residual DPO cannot be stripped or washed from the product, and therefore must be fully reacted.) Suitable mole ratios for the reactants per mole of DPO are three to four moles of carboxylic acid and two to three moles formaldehyde.

The ratio to DPO for the acid catalyst will vary depending on the acid chosen, with a higher ratio needed for the weaker of the acids. One skilled in the art can determine the appropriate ratio for the acid catalyst without undue experimentation. Using phosphorous acid, the ratio per mole of DPO will be in the range of 1.8 to 2.2 moles of phosphorous acid.

After the reaction steps are completed, the work-up and isolation of the product may follow any suitable commercial practice. One such commercial practice is as follows. The reaction mixture is cooled, and washed with a mixture of water and methylene chloride. A suitable ratio of water to methylene chloride is in the range of 70:30 to 60:40. Next, the lower product layer is drawn off and washed with water, then drawn off again, and washed with a mixture of methanol and water. A suitable ratio of water to methanol is in the range of 70:30 to 60:40. After this second washing, the product layer is neutralized to pH 7.5–9.0 using ammonium hydroxide. Methanol is added to the neutralized product layer and the aqueous layer is separated from the product layer. The product layer is washed two more times with methanol and water, dried over sieves and then stripped under vacuum with an air sparge and inhibitors (methoxyhydroquinone, hydroquinone, and butylated hydroxytoluene) to 70–90% solids.

EXAMPLES

In the following comparative and inventive examples, the copolymer synthesized for illustration of this invention was diphenyl methylacrylate (DPMA) having the structure

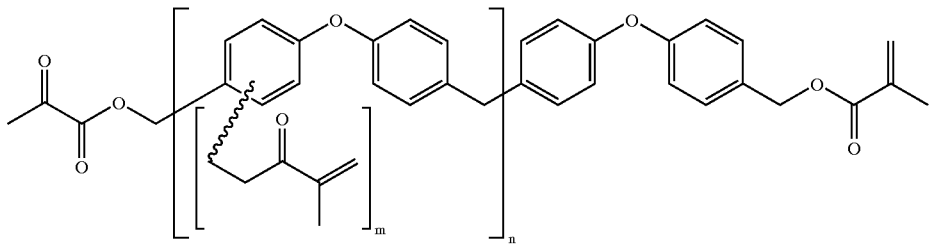

in which n is approximately 3 and n is greater than m. The DPMA copolymer was prepared from the reaction of diphenyl oxide, methyl methacrylate and paraformaldehyde.

Comparative Example 1

Laboratory scale productions of DPMA were made to examine the influence of catalyst amount on reaction conversion. The molar ratio of methacrylic acid to DPO was 4.2 to 1. The molar ratio of paraformaldehyde to DPO was 3.2 to 1. Paratoluene sulfonic acid (PTSA) was used as the catalyst. The molar ratio for the PTSA to DPO, the reaction time, reaction temperature, product viscosity, product percent solids and residual DPO levels are reported in Table 1. The data show that as the molar ratio of the acid increases, the product exhibits increasing viscosity and eventually gels, and the residual DPO levels vary widely.

Comparative Example 2

Commercial scale productions of DPMA were made with a target residual level of DPO selected to be 4000 ppm or less, and the viscosity to be within the range of 28,000 mPa.s or more to 40,000 mPa.s or less at 98% to 99% solids.

Sulfuric acid (SA) at a concentration of 65.2% to 65.5% was used as the catalyst. The molar ratios for the reactants per mole of DPO were 14 moles of MAA, 4.4 moles of CHO, and 9 moles of SA. The reaction temperature was held between 64° to 66° C. for each of the batches in an attempt to control the reaction, and the reaction time was 2 hours and 45 minutes plus or minus 2 to 3 minutes for the various batches.

The reaction times and temperatures for the various batches were all within commercial process control limits, but as reported in Table 2, resulted in a wide range of viscosities and DPO residual levels.

TABLE 2

| | Commercial DPMA Batches | |
|---|---|---|
| Batch # | Viscosity at 98–99% solids, (mPa.s at 50° C.) | Residual DPO (ppm) |
| 7 | 13,200 | 6,525 |
| 8 | 13,200 | 8,528 |
| 9 | 36,500 | 6,007 |
| 10 | 90,000 | 13,840 |
| Target | 28,000–40,000 | <4,000 |

TABLE 1

ParaToluene Sulfonic Acid as Catalyst

| Batch Number | 1 | 2 | 3 | 4 | 5 | 6 |
|---|---|---|---|---|---|---|
| Mole ratio PTSA:DPO | 0.050:1 | 0100:1 | 0.125:1 | 0.150:1 | 0.175:1 | 0.200:1 |
| Reaction Temp (° C.) | 105–110 | 105–110 | 105–110 | 105–110 | 105–110 | 105–110 |
| Reaction Time (hours) | 1.25 | 1.25 | 1.00 | 1.00 | 1.00 | 1.00 |
| Viscosity 25° C. (mPa.s) | 47 | 1,117 | 2,202 | 137,700 | Gelled | Gelled |
| Product Solids (%) | 58.5 | 78.6 | 79.3 | 87.9 | Gelled | Gelled |
| Residual DPO (ppm) | 376 | 13,241 | 2,783 | 2.240 | Gelled | Gelled |

Example

A series of reactions to synthesize DPMA were carried out to investigate the parameters of the reaction process conditions and the effectiveness of an acid with a pKa within the range of 1.2 to 3. Phosphorous acid with a pKa of 2.0 was used as the catalyst. The molar ratios of the reactants, the reaction time, reaction temperature, product viscosity, product percent solids and residual DPO levels are reported in Table 3. The residual level of DPO arbitrarily was specified to be 4000 ppm or less, and the viscosity to be approximately 1,780 mPa.s at 83% solids, and within the range of 15.000 mPa.s or more to 40,000 mPa.s or less at 98% to 99% solids. (It will be understood that specifications for DPO residual level and viscosity of the DPMA product can be chosen depending on the requirements of the end user.)

TABLE 3

Phosphorous Acid as Catalyst

| Batch Number | 11 | 12 | 13 | 14 | 15 | 16 |
|---|---|---|---|---|---|---|
| Mole ratio PA:DPO | 0.7:1 | 0.7:1 | 1:1 | 1:1 | 2:1 | 2:1 |
| Mole ratio MAA:DPO | 3.5:1 | 3.5:1 | 3.5:1 | 4.4:1 | 3.5:1 | 6:1 |
| Mole ratio CHO:DPO | 2.5:1 | 2.5:1 | 2.5:1 | 3.2:1 | 2.5:1 | 4:1 |
| Reaction Temp (° C.) | 90 | 105 | 90 | 90 | 90 | 90 |
| Reaction Time (hours) | 23 | 23 | 48 | 48 | 24 | 24 |
| Viscosity 25° C. (mPa.s) | 548 | 1,465 | 2,213 | 3,976 | 1,941 | 7,745 |
| Product Solids (%) | 84.2 | 85.9 | 90.2 | 89.8 | 83.2 | 89.0 |
| Residual DPO Ppm | 47,988 | 25,817 | 6,352 | 22,387 | 582 | 29 |

The data show that Batch #15 gives viscosity closest to the target viscosity of 1780 mPa.s at 83% solids. Stripping this batch further to 98.2% solids gives product that is 22,000 mPa.s, within the blending specification of 15,000–40,000 mPa.s. The residual DPO of this batch meets the requirement of being less than 4000 ppm.

Using the molar ratios of reactants from Batch 5, and the experimental conditions as the centerpoint, the reaction time and temperature were varied determine effect on viscosity and residual DPO level. The results are reported in Table 4 and indicate that the reaction temperature and time have an insignificant effect on residual DPO, but can have a significant effect on viscosity. The experiments held at 95° C. are almost three to four times higher than the target viscosity, while those held at 85° C. are about half the target viscosity. The centerpoint experiments, Batches 20 and 22 are on target for the viscosity specification. This coincides with the results from Batch 15 in Table 3.

TABLE 4

| Batch Number | Temp (° C.) | Time Hrs | Viscosity (mPa.s at 25° C.) | DPO (ppm) | Solids, (%) |
|---|---|---|---|---|---|
| 17 | 85 | 26 | 1,601 (2,262) | 76 | 84.1 |
| 18 | 95 | 26 | 1,847 (524) | <25 | 78.6 |
| 19 | 95 | 22 | 3,244 (1,133) | 0 | 81.5 |
| 20 | 90 | 24 | 2,365 (2,449) | 560 | 84.4 |
| 21 | 85 | 22 | 2,412 (1,293) | 49 | 82.0 |
| 22 | 90 | 24 | 4,558 (5,297) | 432 | 87.3 |
| Target | | | in parentheses | <4,000 | 80 ± 10 |

What is claimed:

1. A process for the manufacture of a copolymer of the monomers diphenyl oxide, formaldehyde or paraformaldehyde, and an unsaturated carboxylic or dicarboxylic acid, comprising reacting the monomers in the presence of an acid catalyst with a pKa within the range of 1.2 to 3.0.

2. The process according to claim 1 in which the acid catalyst has a pKa within the range of 1.75 to 2.25.

3. The process according to claim 1 in which the acid catalyst is solid phosphorous acid.

4. The process according to claim 1 in which the reaction is conducted within the range of 86° C. or higher to 94° C. or lower, for a time period within the range of 18 hours or more to 30 hours or fewer.

5. The process according to any one of claims 1 to 4 in which the carboxylic or dicarboxylic acid is methacrylic acid.

6. The process according to claim 5 in which the molar ratio of the reactants is 1 mole diphenyl oxide to 3 to 4 moles methacrylic acid to 2 to 3 moles paraformaldehyde.

7. The process according to claim 5 in which the molar ratio of the reactants is 1 mole diphenyl oxide to 3 to 4 moles methacrylic acid to 2 to 3 moles paraformaldehyde to 1.8 to 2.2 moles phosphorous acid.

* * * * *